United States Patent
Li et al.

(10) Patent No.: US 6,989,710 B2
(45) Date of Patent: Jan. 24, 2006

(54) BINARY FREQUENCY-SHIFT KEYING DEMODULATOR AND FREQUENCY-TO-VOLTAGE CONVERTER

(75) Inventors: Larry B. Li, Irvine, CA (US); Zhaofeng Zhang, Shanghai (CN); Jun Wu, Shanghai (CN)

(73) Assignee: Comlent Technology, Inc., Shanghai (CN)

( * ) Notice: Subject to any disclaimer, the term of this patent is extended or adjusted under 35 U.S.C. 154(b) by 61 days.

(21) Appl. No.: 10/850,754

(22) Filed: May 20, 2004

(65) Prior Publication Data

US 2005/0225383 A1 Oct. 13, 2005

(30) Foreign Application Priority Data

Mar. 30, 2004 (CN) .......................... 0410017297 A

(51) Int. Cl.
*H03D 3/00* (2006.01)
*H04L 27/14* (2006.01)
*H04L 27/144* (2006.01)

(52) U.S. Cl. ...................... 329/300; 329/301; 375/324; 375/334

(58) Field of Classification Search ........ 329/300–303; 375/324–328, 334–337
See application file for complete search history.

(56) References Cited

U.S. PATENT DOCUMENTS 5,022,055 A * 6/1991 Leveque ...................... 375/328
6,480,060 B2 * 11/2002 Kawai ......................... 329/301

* cited by examiner

*Primary Examiner*—David Mis
(74) *Attorney, Agent, or Firm*—Clement Cheng

(57) ABSTRACT

A BFSK demodulator comprises a three-channel frequency-to-voltage converter, an information signal inputting the first-channel frequency-to-voltage converter, a converted information signal inputting the second-channel frequency-to-voltage converter, wherein outputs of first and second channel frequency-to-voltage converter are connected with a capacitor, a output voltage signal produced by the first and second frequency-to-voltage converters and the capacitor, inputting into a positive terminal of the comparator after high frequency noise filtering through a first low-pass filter, a carrier signal inputs into the third-channel frequency-to-voltage converter; and an output from the third-channel frequency-to-voltage converter connected to a capacitor; and a reference voltage signal is produced after high frequency noise filtering through a second low-pass filter, producing a demodulated signal after comparing the information voltage signal with the reference voltage.

9 Claims, 3 Drawing Sheets

BINARY FREQUENCY-SHIFT KEYING DEMODULATOR AND FREQUENCY-TO-VOLTAGE CONVERTER

TECHNICAL FIELD

The present invention relates to a wireless communication receiver device, particularly relates to a binary frequency-shift keying demodulator comprising a frequency-to-voltage converter.

BACKGROUND OF THE INVENTION

Among wireless communication devises, demodulator is often seen as one of the most important component in receiver end. Demodulators are utilized at the rear end of the receiver to demodulate the signal modulated from the front end, matching the initial information signal. Bit Error-Rate (BER) is the important key to rate such demodulators. Current Binary Frequency-Shift Keying (BFSK) signal demodulation methods can be categorized as coherent demodulation and incoherent demodulation, where the incoherent demodulation has lower resistance to noise. Among several coherent demodulation implementations, differential demodulator is easily structured and it also provides lower Bit Error-Rate. In addition, differential demodulator does not require local carrier wave, and it also demands lower precision of the resonator while it has lower phase error caused by the carrier signal. It is one of the most common demodulation methods, as it is referred in FIG. 1.

As shown in FIG. 1, the traditional differential demodulator multiplies the information signal with a delay signal (delay time is normally T/4), and produces an output signal before a $2\omega_{IF}$ signal being filtered out by a low-pass filter. Then the filtered signal is compared with a reference voltage signal before a digital signal is produced. Phase-shifting circuit is normally implemented by forming an external RLC loop circuit. However, this implementation is especially difficult in dealing with functional dispersedness caused by external implemented elements.

In addition, since the reference voltage is also important as it affects the Bit-Error Rate (BER) directly, the reference voltage has to be flexibly set according to its fabrication and implementation environments.

The major disadvantages of differential demodulator are the lager circuit board design, which causes power consumption, and a necessary addition of an external phase-shifting circuit. Such large board and external circuit design is easier affected by fabrication processes. Therefore under the circumstances when the information signal is similar to carrier signal, the demand on the filter is higher, such a differential demodulator is not appropriate anymore.

SUMMARY OF THE INVENTION

The present invention is to provide a BFSK demodulator that is without external support and has a simpler but more condensed circuit structure design. For lowering Bit-Error Rate (BER), the present invention also provides a frequency-to-voltage circuit.

The present invention provides a BFSK demodulator comprising a three-channel frequency-to-voltage converter, a BFSK information signal inputting the first-channel frequency-to-voltage converter and a converted BFSK information signal inputting the second-channel frequency-to-voltage converter. The outputs of first and second channel frequency-to-voltage converter are connected with a capacitor $C_o$, whereas the other end of the capacitor $C_o$ is connected to the ground. A voltage signal $V_o$ is produced by the first and second frequency-to-voltage converters and the capacitor. The voltage signal $V_o$ becomes the positive input to the comparator after high frequency noise filtering through a first low-pass filter. A carrier signal inputs into the third-channel frequency-to-voltage converter, and an output from the third-channel frequency-to-voltage converter is connected to a capacitor $C_4$, whereas the other end of the capacitor $C_4$ is connected to the ground. A voltage signal $V_{ref}$ is produced after high frequency noise filtering through a second low-pass filter. A demodulated signal is activated and produced after comparing the voltage signal $V_o$ with the reference voltage $V_{ref}$.

For improving Bit-Error Rate (BER), the present invention also provides a frequency-to-voltage circuit, comprising a current source $I_{in}$, a PMOS transistor $M_{p1}$, NMOS transistor $M_{n2}$, $M_{n3}$, and $M_{n4}$, and a capacitor $C_1$.

Input signal $F_{in}$ is connected to the gate terminals of transistors $M_{p1}$ and $M_{n2}$. The source terminal of $M_{n2}$ is connected to the ground. Current source $I_{in}$ is connected to the source terminal of $M_{p1}$ and the drain terminal of $M_{n2}$. The drain terminal of transistor $M_{p1}$ is connected to a capacitor $C_1$, the drain terminal transistor $M_{n4}$, and the drain terminal of transistor $M_{n3}$. The other end of the capacitor $C_1$ and the source terminal of $M_{n3}$ are both connected to the ground. Signal $\Phi_1$ is input into the gate terminal of transistor $M_{n3}$; Signal $\Phi_2$ is input into the gate terminal of transistor $M_{n4}$. The source terminal of $M_{n4}$ becomes the output of the frequency-to-voltage converter. Current source $I_{in}$ provides the charging current on capacitor $C_1$.

The present invention provides a BFSK demodulator further comprising a PMOS transistor $M_{p5}$, a NMOS transistor $M_{n6}$, and a charge time control circuit. Transistor $M_{p5}$ is implemented to reduce the charge injection effect. The source terminal of the $M_{p5}$ is connected with the drain terminal of $M_{n4}$, while the drain terminal of $M_{p5}$ is connected to the source terminal of $M_{n4}$. The gate terminal of $M_{p5}$ is connected to signal $\Phi_2$. The drain terminal of transistor $M_{n6}$ is connected with the drain terminal of transistor $M_{p3}$, where as the source terminal is connected to the ground. The time control circuit is connected ill between the input signal Fin and the gate terminal of transistor $M_{n6}$, and controls the $C_1$ charging time from current source $I_{in}$ bypassing the transistor $M_{n6}$.

The present invention does not require any external support elements. The present invention has a simpler, smaller circuit board design, and has a lower power consumption rate.

Comparing to existing differential demodulator, the present invention abandoned the low-pass filter, adopted a comparatively simpler comparator circuit using a referenced voltage. Since the referenced voltage signal and the information voltage input signal are produced by the same frequency-to-voltage converter, the sensitivities toward the fabrication environments also appear to be similar. Also, the time controlled frequency-to-voltage-converter circuit can efficiently enlarge the voltage difference matching the demodulated frequencies, and improve the Bit-Error Rate.

Thus, present invention has the advantage of employing a simpler, smaller, but more condensed circuit implementation, having a better Bit-Error rate.

DETAIL DESCRIPTION OF THE INVENTION

Figure 1:
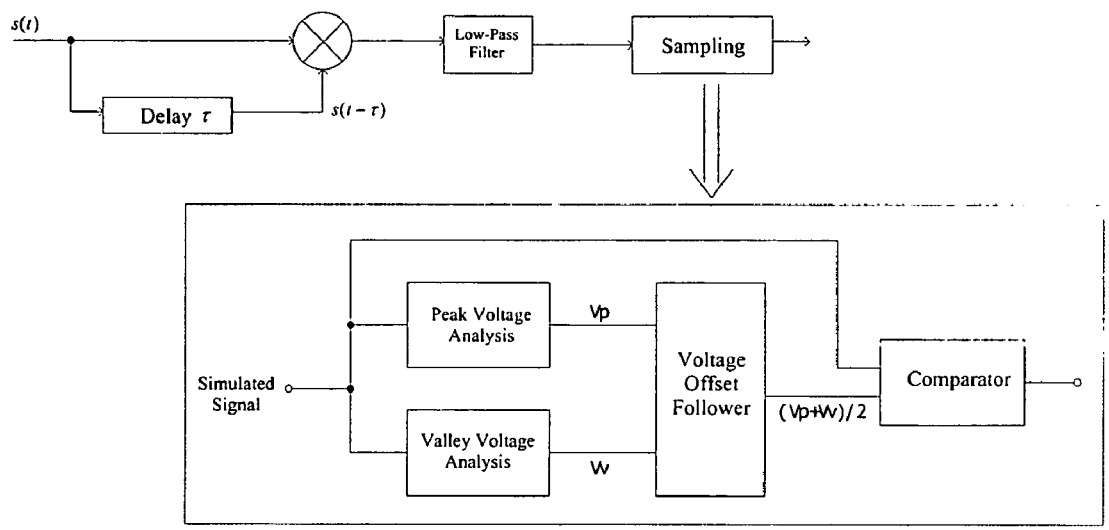
FIG. 1 is a block diagram of a prior art Binary Frequency-Shift Keying Differential Demodulator
Figure 2:
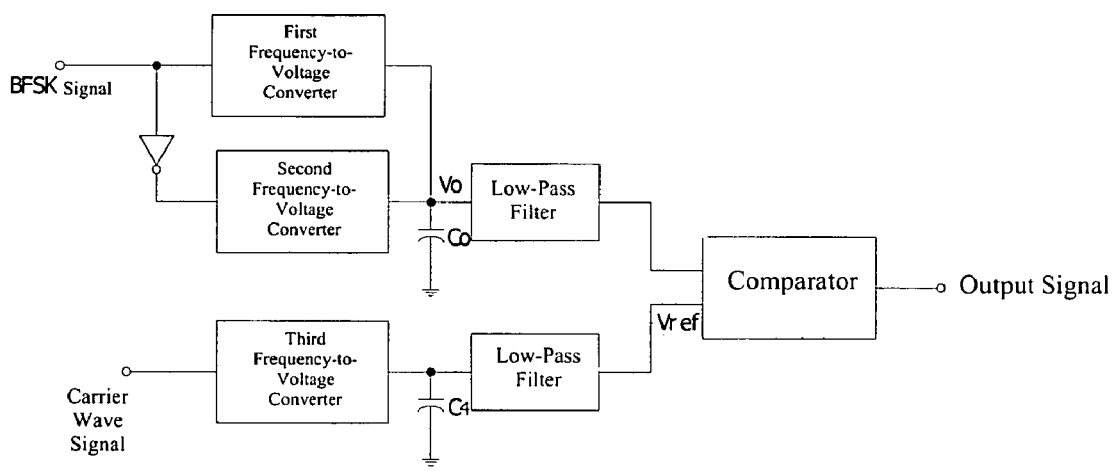
FIG. 2 is a block diagram of a Binary Frequency-Shift Keying Demodulator in present invention

As is seen in FIG. 2, the present invention provides a BFSK demodulator comprising a three-channel frequency-to-voltage converter. Frequency-to-voltage converter converts a frequency signal into a voltage signal. A BFSK information signal is input into the first-channel frequency-to-voltage converter and a converted BFSK information signal is input the second-channel frequency-to-voltage converter. The outputs of first and second channel frequency-to-voltage converter are connected with a capacitor Co, whereas the other end of the capacitor Co is connected to the ground. A voltage signal Vo is produced by the first and second frequency-to-voltage converters and the capacitor. The voltage signal Vo becomes the positive input to the comparator after high frequency noise filtering through a first low-pass filter. Converting the BFSK information signal and using the same frequency-to-voltage circuits are to rearrange electron more frequent. Therefore charges are conducted on capacitors during both positive and negative charging circles, whereas the voltage output from the frequency-to-voltage circuit more precisely mirrors the actual frequency changes. Such implement is well adopted in a receiver device which receives similar information input and carrier wave frequencies.

A carrier signal inputs into the third-channel frequency-to-voltage converter, and an output from the third-channel frequency-to-voltage converter is connected to a capacitor $C_4$, whereas the other end of the capacitor $C_4$ is connected to the ground. A voltage signal $V_{ref}$ is produced after high frequency noise filtering through a second low-pass filter. A demodulated signal is activated and produced after comparing the voltage signal Vo with the reference voltage $V_{ref}$.

The present invention abandoned the low-pass filter, instead adopted a comparatively simpler comparator circuit using a referenced voltage. Since the referenced voltage signal and the information voltage input signal are produced by the same frequency-to-voltage converter, the sensitivities toward the fabrication environments also appear to be similar. Also, the time controlled frequency-to-voltage-converter circuit can efficiently enlarge the voltage difference matching the demodulated frequencies, and improve the Bit-Error Rate.

Figure 3:
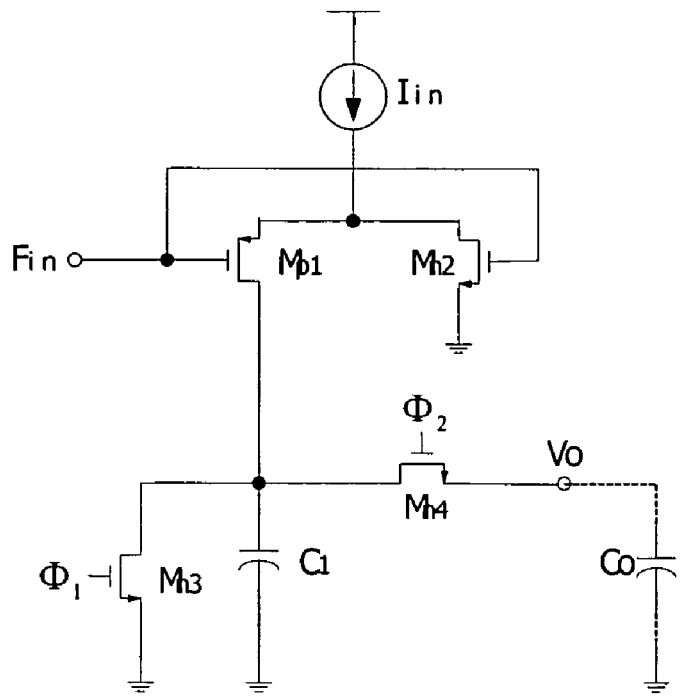
FIG. 3 is a circuit illustration of a prior art frequency-to-voltage converter

FIG. 3 is a circuit illustration of a prior art frequency-to-voltage converter. Referring to FIG. 3, the voltage on capacitor C is referring to voltage of the information frequency signal. It is well known that with a smaller capacitor $C_2$, more frequent capacitor $C_1$ charges, the voltage on capacitor $C_2$ is closer to the initial voltage on capacitor $C_1$. However, if the capacitor Co is too small, a parasitical capacitor exists. Therefore the output voltage must not be steady. The existence of the spikes caused from the parasitical capacitor values would also affect the final Bit Error Rate.

Figure 4:
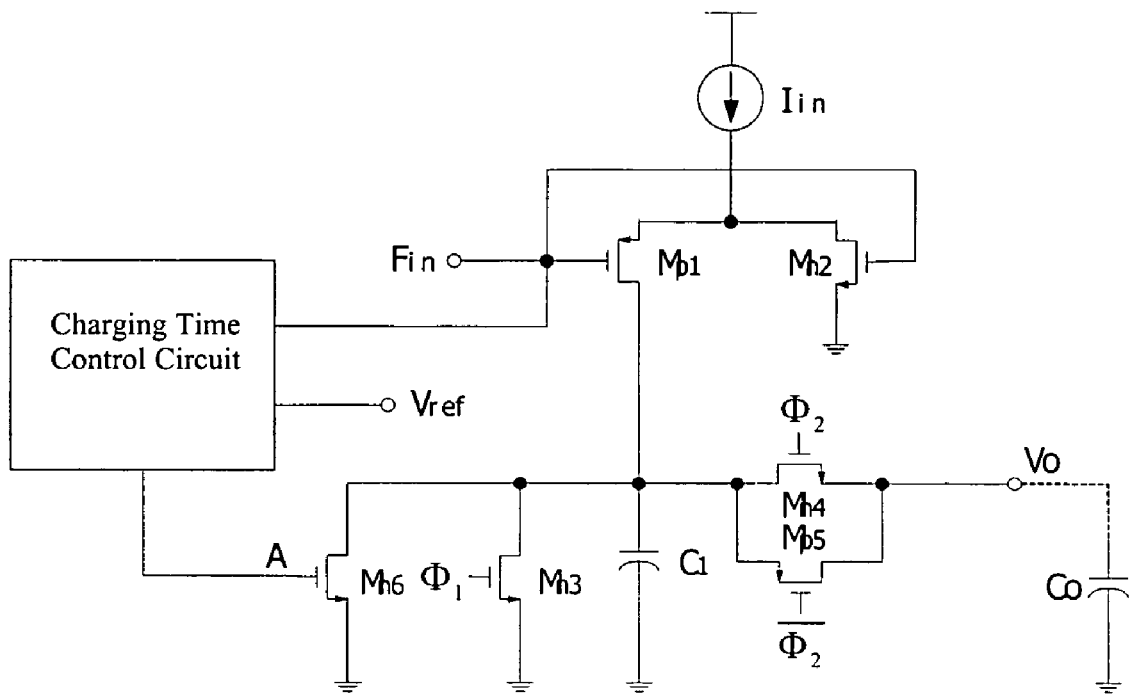
FIG. 4 is a circuit illustration of a frequency-to-voltage converter in present invention
Figure 5:
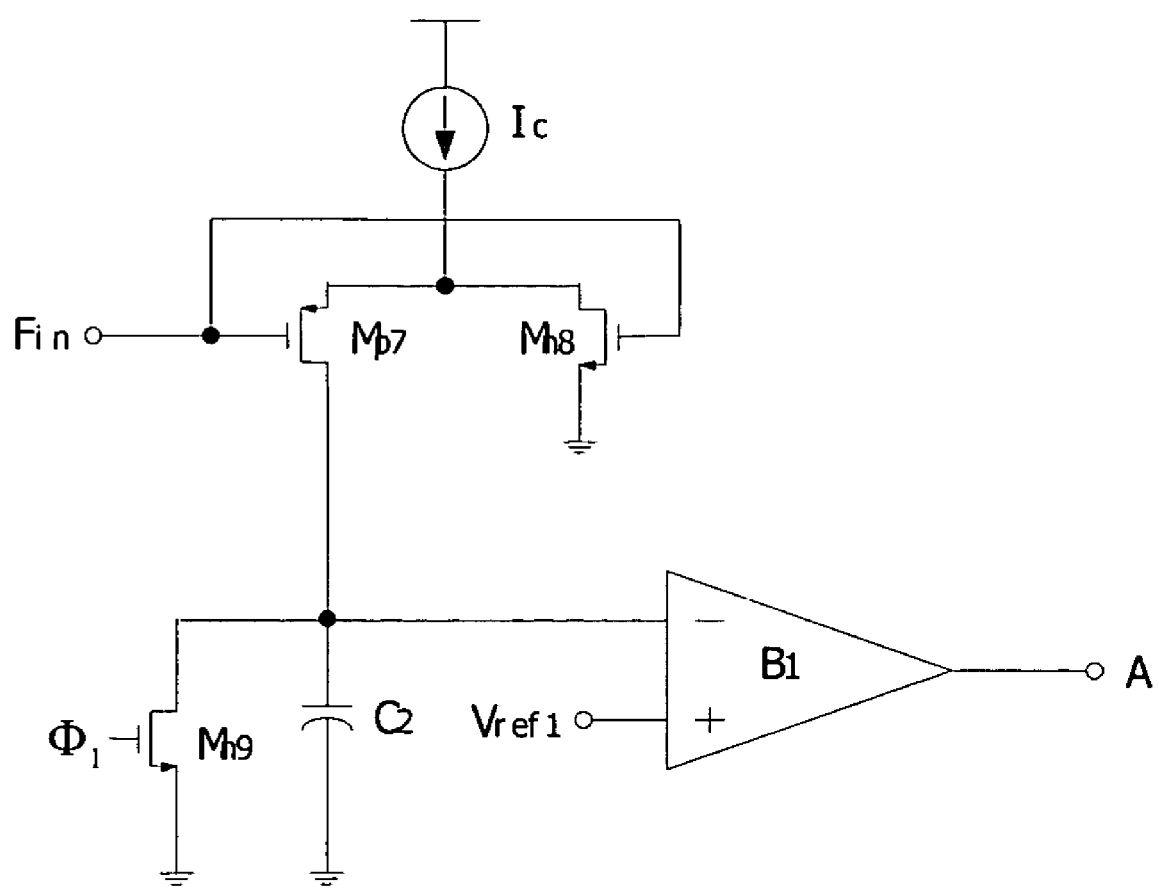
FIG. 5 is a circuit illustration of a charging time control circuit in present invention

Referring to FIG. 4, the present invention also provides a frequency-to-voltage circuit, comprising a current source $I_{in}$, a PMOS transistor $M_{p1}$, NMOS transistors $M_{n2}$, $M_{n3}$, and $M_{n4}$, and a capacitor $C_1$.

Input signal $F_{in}$ is connected to the gate terminals of transistors $M_{p1}$ and $M_{n2}$. The source terminal of $M_{n2}$ is connected to the ground. Current source $I_{in}$ is connected to the source terminal of $M_{p1}$ and the drain terminal of $M_{n2}$. The drain terminal of transistor $M_{p1}$ is connected to a capacitor $C_1$, the drain terminal transistor $M_{n4}$, and the drain terminal of transistor $M_{n3}$. The other end of the capacitor $C_1$ and the source terminal of $M_{n3}$ are both connected to the ground. Signal $\Phi_1$ is input into the gate terminal of transistor $M_{n3}$; Signal $\Phi_2$ is input into the gate terminal of transistor $M_{n4}$. The source terminal of $M_{n4}$ becomes the output of the frequency-to-voltage converter. Current source $I_{in}$ provides the charging current on capacitor $C_1$. $\Phi_1$ and $\Phi_2$ are both pulse signals. $\Phi_1$ is used in capacitor $C_1$'s discharging process. $\Phi_2$ is used to transmit $C_1$ charging voltage to the output terminal.

The present invention provides a BFSK demodulator further comprising a PMOS transistor $M_{p5}$, a NMOS transistor Mn6, and a charge time control circuit. Transistor $M_{p5}$ is implemented to reduce the charge injection effect. The source terminal of the $M_{p5}$ is connected with the drain terminal of $M_{n4}$, while the drain terminal of $M_{p5}$ is connected to the source terminal of $M_{n4}$. The gate terminal of $M_{p5}$ is connected to signal $\Phi_2$. The drain terminal of transistor $M_{n6}$ is connected with the drain terminal of transistor $M_{n3}$, where as the source terminal is connected to the ground. The time control circuit is connected in between the input signal Fin and the gate terminal of transistor $M_{n6}$, and controls the $C_1$ charging time from current source $I_{in}$ bypassing the transistor $M_{n6}$.

The charge time control circuit comprises a comparator $B_1$, a PMOS transistor $M_{p7}$, an NMOS transistor $M_{n8}$, an NMOS transistor $M_{n9}$, and a capacitor $C_2$. The drain terminal of transistor $M_{p7}$ is connected with the drain terminal of $M_{n9}$, the capacitor $C_2$, and the negative input of the comparator $B_1$. The source terminal of $M_{n9}$ is connected to the ground. The other end of the capacitor $C_2$ is also connected to the ground. The source terminal of $M_{p7}$ and the drain terminal of transistor $M_{n8}$ are provided with current source $I_c$. Information input signal $F_{in}$ is provided to the gate terminals of transistors $M_{p7}$ and $M_{n8}$. A reference voltage input is provided in the positive input of the comparator $B_1$. The output terminal of comparator $B_1$ is connected to the gate terminal of transistor $M_{n6}$, as shown in FIG. 4.

When the information input signal $F_{in}$ is LOW, transistors $M_{p1}$ and $M_{p7}$ are ON, signals $\phi_1$, $\phi_2$ are LOW, transistors $M_{n3}$, $M_{n4}$, $M_{n5}$, and $M_{n9}$ are all OFF. Current source $I_{in}$ charges capacitor $C_1$ and current source $I_c$ charges capacitor $C_2$. As voltage value on Capacitor $C_2$ is lower than the reference voltage input signal, voltage on point A becomes HIGH. Transistor $M_{n6}$ turns ON, while the voltage on capacitor $C_1$ is zero. As voltage value on Capacitor $C_2$ is raising and becoming higher than the reference voltage input signal, voltage on point A becomes LOW. Transistor $M_{n6}$ turns OFF, while the voltage on capacitor $C_1$ is rising.

When the information input signal $F_{in}$ is HIGH, transistors $M_{p1}$ and $M_{p7}$ are OFF, while transistors $M_{p2}$ and $M_{p8}$ turn ON. Signal $\phi_2$ turns HIGH while $\phi_1$, is still LOW. Electrons are rearranged on capacitors $C_1$ and Co. Then $\phi_2$ turns LOW and $\phi_1$ turns HIGH. Capacitor $C_1$ discharges until the voltage value reaches zero. $\phi_1$, $\phi_2$ turn back LOW until the next signal circle.

To a frequency f information input, the output voltage $V_{out}$ is $$V_{out} = \frac{I_{in}}{C_1 f} - \frac{I_{in}}{I_c} V_{refl}$$

The time controlled frequency-to-voltage-converter circuit can efficiently enlarge the voltage difference matching the demodulated frequencies, therefore improves the Bit-Error Rate.

Since the output from the frequency-to-voltage converter is a voltage signal, a converting process conducted by voltage-to-current converter is necessary to produce a current signal input to the current mode differentiator, as it is designed at the first level in the present differentiator circuit. It is therefore needed a current-to-voltage converter to convert the current output from the differentiator into a voltage signal.

The invention claimed is:

1. A BFSK demodulator comprising
 a three-channel frequency-to-voltage converter;
 an information signal inputting the first-channel frequency-to-voltage converter;
 a converted information signal inputting the second-channel frequency-to-voltage converter, wherein outputs of first and second channel frequency-to-voltage converter are connected with a capacitor;
 a output voltage signal produced by the first and second frequency-to-voltage converters and the capacitor, inputting into a positive terminal of the comparator after high frequency noise filtering through a first low-pass filter;
 a carrier signal inputs into the third-channel frequency-to-voltage converter; and
 an output from the third-channel frequency-to-voltage converter connected to a capacitor; and
 a reference voltage signal is produced after high frequency noise filtering through a second low-pass filter, producing a demodulated signal after comparing the information voltage signal with the reference voltage.

2. The BFSK demodulator of claim 1, wherein the frequency-to-voltage converter further comprises six transistors and a charge time control circuit connected in between the information signal and the transistors.

3. The charge time control circuit of claim 2 further comprising
 a comparator;
 a reference voltage input connecting with the positive input terminal of the comparator; and
 a capacitor receiving charging signal from a plurality of transistors, and providing a control signal to the positive input terminal of the comparator.

4. The frequency-to-voltage converter of claim 2 further comprises a current source connecting to the source terminal of the first transistor and the drain terminal of the second transistor, and a capacitor connecting to the drain terminals of the first transistor, the third transistor and the forth transistor; the drain terminal of the forth transistor is connected to the source terminal of the fifth transistor, while the drain terminal of the fifth transistor is connected to the source terminal of the forth transistor; wherein the information voltage signal is connected to the gate terminals of the first and the second transistors.

5. A method of producing a demodulated BFSK signal comprising the steps of:
 a. converting a BFSK information signal into a first voltage signal through a first frequency-to-voltage converter;
 b. converting a converted BFSK information signal into a second voltage through a second frequency-to-voltage converter signal;
 c. producing a voltage output;
 d. filtering the voltage output;
 e. comparing the filtered voltage output with a reference voltage.

6. The method of producing a demodulated BFSK signal in claim 5, wherein producing the reference voltage signal comprise the steps of:
 a. converting a career wave signal to voltage signal through a third frequency-to-voltage converter;
 b. producing a voltage output;
 c. filtering the voltage output.

7. The method of producing a demodulated BFSK signal in claim 5, wherein the frequency-to-voltage converter comprises six transistors and a charge time control circuit connected in between the information signal and the transistors.

8. The charge time control circuit of claim 7 further comprising
 a comparator;
 a reference voltage input connecting with the positive input terminal of the comparator; and
 a capacitor receiving charging signal from a plurality of transistors, and providing a control signal to the positive input terminal of the comparator.

9. The frequency-to-voltage converter of claim 7 further comprises a current source connecting to the source terminal of the first transistor and the drain terminal of the second transistor, and a capacitor connecting to the drain terminals of the first transistor, the third transistor and the forth transistor; the drain terminal of the forth transistor is connected to the source terminal of the fifth transistor, while the drain terminal of the fifth transistor is connected to the source terminal of the forth transistor; wherein the information voltage signal is connected to the gate terminals of the first and the second transistors.

* * * * *